May 7, 1963  H. R. SILLS  3,089,049
SALIENT POLE ROTOR CONSTRUCTION
Filed Dec. 9, 1959  2 Sheets-Sheet 1

INVENTOR.
HUBERT R. SILLS
BY *James R Campbell*
ATTORNEY

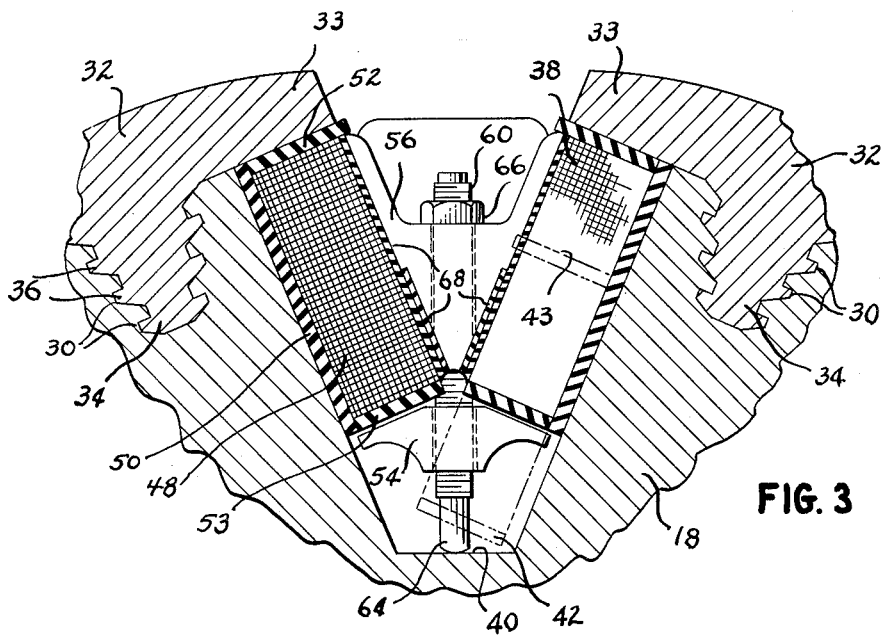

United States Patent Office 3,089,049
Patented May 7, 1963

3,089,049
SALIENT POLE ROTOR CONSTRUCTION
Hubert R. Sills, Peterborough, Ontario, Canada, assignor to Canadian General Electric Company, Limited, Toronto, Ontario, Canada, a corporation of Canada
Filed Dec. 9, 1959, Ser. No. 858,496
Claims priority, application Canada May 12, 1959
3 Claims. (Cl. 310—269)

The invention described herein relates to dynamoelectric machines and more particularly to an improved construction of field poles used in a salient pole rotor.

In assembling the field poles on a salient pole rotor for a dynamoelectric machine, it is customary to fit a preformed coil to the pole body in a manner such that removal of the coil for repair or replacement can be made easily and quickly. In conventional constructions, the magnetic pole body usually comprises a plurality of stacked laminations, each of which includes an enlarged pole shoe section on the outer end and a dovetail projection at the inner end. A preformed coil is fitted on the completed pole and the assembly of pole and coil then secured to a rotor spider by locating the dovetail of the pole body in a complementary keyway in the core. In this kind of construction, the dovetail and its cooperating keyway must be sufficiently strong to contain the combined weight of the coil and pole body when the rotor is operated and the parts subjected to centrifugal forces. Salient poles of this design have found successful use in both low and medium speed machines. However, with the trend toward higher pole velocities, available materials utilizing present dovetail-keyway joint designs cannot resist the severe stresses imposed thereon by centrifugal forces.

An alternative construction found effective in reducing the load carried by the mechanical joint, consists of a rotor core having the magnetic body of the poles formed integral therewith and provided with removable pole shoes or tips. A preformed coil is placed on the pole from the tip end and held in place by the pole shoe which is bolted or pinned or otherwise attached to the pole body. This arrangement reduces the weight required to be carried by the fastening means to that of a pole shoe and a coil, but the advantage obtained is materially reduced by the fact that the fastening means so far devised weakens the pole tip structure.

My United States Patent 2,736,829 and Canadian Patent 539,325 describe several arrangements for supporting a laminated or solid pole shoe on the outer face of a pole body which is integral with the rotor core or spider.

In Patent 2,736,829 there is disclosed a construction wherein a groove is machined lengthwise in the outer portion of each pole body and parallel to the axis of the rotor. The profile of the groove is that of a "pinetree" section or configuration. A groove machined in the end plates of the pole body is similar in contour but of less width and a narrow transverse slot is machined in the pole body midway of its length. To assemble the field pole, a preformed hollow rectangular field coil is placed over the pole body formed integral with the rotor core. Next, pinetree projections on pole shoe end plates are inserted in the pole body slot and the end plates are then pushed toward each end of the pole body where the projections mate with the groove in the pole body end plates. Pole shoe punchings with projecting tips at the top and pinetree projections at the bottom are inserted in the transverse slot and pushed toward the end plates, their projections mating with the pinetree groove in the pole body. When the stacks of pole shoe punchings are built up to the edges of the transverse slot, a filler piece is inserted in the slot and secured by suitable means to complete the pole.

In Patent 539,325 there is disclosed a construction wherein a groove is also machined lengthwise in the outer portion of each pole body, but in this case, the serrations forming the pinetree profile slope downwardly at an angle to the longitudinal axis of the pole from the mid-portion of the pole body toward each end. Again a preformed field coil is placed over the integral pole body. To complete the pole, a pole shoe made of two sections whose combined length is less than the longitudinal length of the pole is provided. Each section of the pole shoe has a tip extending along two sides and one end, and has a wedge shaped projection on the bottom which is machined with serrations to provide surfaces complementary to the serrations forming the sloping surfaces in the top of the pole body. To assemble a pole shoe on the pole body, it is necessary to position one section of pole shoe inwardly from the end of the pole body a distance to permit complementary serrations in the pole body and pole shoe projection to mate. The shoe is then pressed downwardly and outwardly until the pole shoe tips engage the top of the pole body. The second section of pole shoe likewise is inserted in the other end of the pole body. A filler plate is then placed in the resulting gap between pole body sections and suitably secured to complete the assembly.

While the means disclosed in these two patents have in themselves produced satisfactory results, subsequent investigation indicated that in many instances it would lower the cost, expedite assembly, simplify and strengthen construction, if each pole shoe, with pinetree dovetails machined at the bottom, could be made from a one piece forging and inserted directly into the pole body.

Accordingly, it is an object of my invention to provide an improved field pole construction including a removable pole shoe of one-piece, high strength design capable of being assembled quickly on the pole body.

Another object of my invention is to provide an improved field pole construction capable of withstanding centrifugal forces resulting from high field pole velocities.

Still another object of my invention is the provision of an improved field pole design which facilitates assembly of field coils on pole bodies made integral with the rotor spider.

In carrying out my invention, I provide a magnetic core having integrally formed pole bodies projecting radially outwardly therefrom. A pole shoe is locked on the end of each pole body by a serrated groove arrangement for transmitting centrifugal forces to the rotor spider. In order to facilitate assembly of a coil on each pole, the pole body is made of a height sufficient to provide the clearance necessary for installation of coils on adjacent pole bodies. Each coil is restrained against radial and circumferential displacement by interpolar locking devices which exert forces in a direction effective in wedging the coils in an immovable position.

While the specification concludes with claims particularly pointing out and distinctly claiming the subject matter which I regard as my invention, it is believed the invention will be better understood from the following description taken in connection with the accompanying drawings in which:

FIGURE 2 is a cross-sectional view in elevation of one pole body, pole tip, and coil assembly;

FIGURE 3 is a cross-sectional view in elevation of the interpolar construction used for holding field coils in position;

FIGURE 5 is a perspective view of a rotor pole jacking block.

Figure 1:
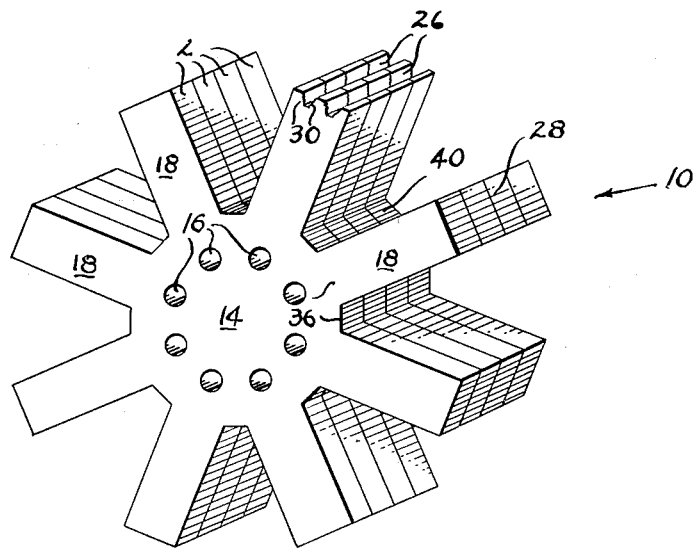
FIGURE 1 is a perspective view of a rotor spider including an integral pole body construction.

Referring now to the drawings wherein like reference characters designate like or corresponding parts throughout the several views, there is shown in FIGURE 1, a salient pole rotor 10 comprising a plurality of aligned laminations or other steel plates 12 assembled together to form the rotor core. Each lamination 12 is equipped with a central member 14 having a series of longitudinal holes 16 and pole bodies 18 projecting radially therefrom. When the laminations are assembled to form the core as shown in the bottom half of FIGURE 4, bolts 20 are inserted through the aligned hole 16 and flanges 22 attached to shaft 24 for holding the laminations under pressure and preventing subsequent displacement thereof when the rotor is operated. Alternatively, other well known arrangements for mounting the steel plates or laminations may be resorted to if desired.

The pole bodies 18 effectively replace the separate laminated or solid magnetic pole bodies of the prior art which were bolted, pinned, or otherwise attached to rotor spider. In order to provide a construction on the pole body for receiving a pol shoe and coil necessary for forming a complete field pole, one or more grooves 26 are machined in the outer surface 28 of each pole body 18. The grooves extend inwardly from the pole tip and lie along its entire length in a line substantially parallel to the axis of the rotor. As clearly shown in FIGURES 1, 2 and 3, the sloping side walls of each groove 26 are machined to provide serrations 30 having a profile of pinetree configuration as clearly shown in FIGURES 2 and 3.

Pole shoes or tips 32 of matching pinetree design are adapted for installation in the pole body groove 26 without using bolts, screws, or other securing devices. Each pole shoe comprises a one-piece steel forging or casting, although preformed laminated structures may be used having flanges 33 designed to overhang the pole body after installation. At least one dovetail projection 34 of the same pinetree profile as groove 26, is integrally formed on the other end of the pole shoe and comprises a series of tongues 36 adapted for mating with serrations 30 and interlock therewith, for firmly securing the pole shoe on the pole body.

As is now evident, the pinetree dovetail joint is of generally triangular or frusto-triangular outline with the base thereof lying in the direction of the thrust exerted thereon, and in which each of the sloping sides is provided with a plurality of interfitting serrations. The dovetail projection 34 of each pole shoe 32 has the same axial length as the pole body 18, while the curved flange 33 extends outwardly therefrom an amount sufficient to support the coil ends, instead of the end plates shown in Patent 2,736,829. Although the drawings show two mating grooves and dovetails per pole body, the number used obviously may be one or more.

In order to permit assembly of coils on the pole bodies 18, the latter are made of a height equal to the depth of coil 38 plus the depth of groove 26. In assembling the field pole, a preformed hollow rectangular field coil 38 is slipped over the end of a pole body 18 and pushed down to the bottom of the interpolar space 40 until it abuts the core, as indicated by dotted lines 42 in FIGURE 3, leaving that portion of the pole body 18 with the pinetree dovetail grooves 26 extending radially beyond the end of the coil, as indicated by dotted line 43. The pole shoe 32 is then attached to the pole body by sliding the pinetree projection 34 into intermeshing relationship with the corresponding serrated grooves 26, and anchored in place by tapered keys 44 driven from opposite directions into a keyway 46 provided in pole shoe 32. Other suitable fastening means may be used, such as set screws threaded through the outer face of the pole shoe and into engagement with the end 28 of the pole body.

To install the next coil 48 on an adjacent pole body, the previously mounted coil 38 is moved outwardly into abutting engagement with the overhanging flange 33 and manually held in position. Coil 48 is then slid over the next pole body and moved inwardly until it bottoms against the core. The pole shoe is installed in the manner previously described, and the process then is repeated for the remaining coils and pole shoes to be installed on the rotor pole bodies. It is to be noted that the interpolar space 40 must be sufficiently wide to permit movement of one coil inwardly into abutting engagement with the core when the next adjacent coil is seated in contact with the flange 33 of the adjacent pole shoe. It is apparent that the concept of using a long pole body for furnishing a space for accommodating adjacent coils also has application to field poles in which the pole shoe is bolted or otherwise attached to the pole body.

The coils may be formed from copper or aluminum wire or strip material with suitable insulation 50 being disposed between the conductors and iron of the magnetic core. Top and bottom collars 52 and 53 are located on opposite ends thereof in the usual manner.

Figure 4:
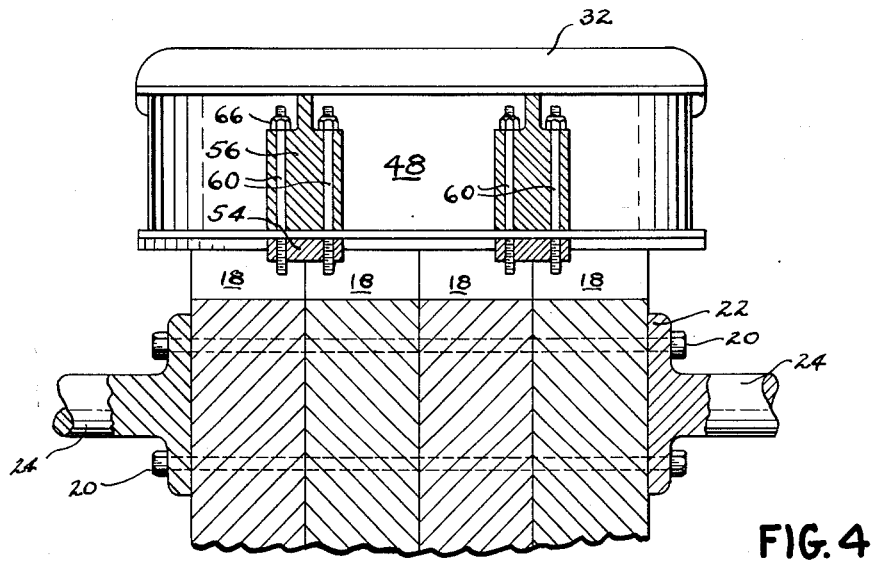
FIGURE 4 is a longitudinal view of the rotor pole construction taken on lines 4—4 of FIGURE 3.

When all the coils and pole shoes have been assembled on the pole bodies, it is necessary to fix the coils immovably in position. This is accomplished by utilizing jacking blocks 54 and support blocks 56 spaced along the length of the coil and between adjacent poles in the manner shown in FIGURES 3 and 4. The jacking block 54 shown in FIGURE 5 is equipped with beveled faces 58 sloped at an angle the same as that made by the bottom of the coil with the rotor axis. When the jacking block is located in the interpolar space and beneath the coils, the bottom collars 53 are in substantially complete contact with the beveled faces 58. A pair of studs 60 threaded through holes 62 in the block have their ends 64 bearing against the core so that upon rotation of the studs, the block is drawn outwardly, thus forcing the coil into firm engagement with the overhanging flange on the pole Support blocks 56 have sides shaped to the angle of the coil sides and are equipped with holes for receiving stud 60. Tightening of nuts 66 on the studs forces the blocks into firm engagement with the stepped insulation 68 on the coil sides for preventing their displacement circumferentially when the core is rotated. Depending on the size of the machine, additional jacking and support blocking arrangements may be used as shown in FIGURE 4. The bottom collar 53 of each coil is set out from pole root 40 a sufficient distance for providing a channel through which air may pass axially for carrying away heat from both the coil and the pole body. A more effective cooling arrangement resides in additionally locating insulation blocks between each coil and its corresponding pole body for permitting the cooling air to also flow in a direction parallel with the field coil structure. Grooves may be provided in the pole shoe adjacent the outer collar for serving as exhaust passages for the cooling air. The rotor construction of the invention lends itself to such an arrangement where cooling the inside as well as the outside of a coil is desired.

Although I have described my invention with reference to a rotor having a solid core, the steel laminations may take the form of rings and be machined to allow rim ventilation, as disclosed in my Canadian Patent 418,847. Other well known forms of construction will be apparent to those skilled in the art, such as using T-shape and other dovetail designs for providing an interlocking joint between the pole shoe and pole body.

The rotor of the salient pole type disclosed, has the field coils mounted on pole bodies integral with the core, in which the parts necessary to hold the heavy coils securely against the action of centrifugal force are of great strength because the pole shoes are machined from forged steel and the stress on the joints is distributed by means of the pinetree profile. The construction permits attachment of one piece pole shoes to the pole bodies against which the coils may be firmly secured during final assembly. A particular advantage derived from this arrangement is that weaknesses formerly associated with bolted pole shoe constructions are eliminated.

In view of the above, it will be evident that many modifications and variations are possible in light of the above teachings. It therefore is to be understood that within the scope of the appended claims, the invention may be practiced otherwise than as specifically described.

What I claim as new and desire to secure by Letters Patent of the United States is:

1. A rotor construction for a salient pole dynamoelectric machine comprising a magnetic core composed of steel laminations, each lamination including a central portion having radially extending pole bodies, grooves of pinetree configuration in the outer surface of each pole body and a pole shoe having a projection of similar pinetree design so that when the grooves are engaged by the projections of the pole shoe, the latter is restrained against radial displacement, a coil on each pole body having one end in contact with a pole shoe flange, locking means positioned in the interpolar space between adjacent poles for holding the coils in intimate contact therewith, said locking means comprising a pair of spaced blocks respectively in contact with the exposed sides of the coils facing the interpolar space and with the surfaces of the other ends of coils mounted on adjacent pole bodies, and a device engageable with said blocks for urging them into contact with said coil surfaces for preventing coil displacement when the rotor is placed in operation.

2. A rotor construction for a salient pole dynamoelectric machine comprising a magnetic core having a plurality of integrally formed pole bodies extending radially outward therefrom, at least one serrated groove in the outer surface of each of said pole bodies and a pole shoe for each pole body, each of said shoes having an outer rounded surface and a projection on the opposite side thereof of the same design as the groove in said pole bodies so that when the projections of the pole shoe are moved axially into engagement with the groove in the pole bodies, the pole shoe is restrained against subsequent radial displacement, a coil on each of said pole bodies having its outer end bearing against a pole shoe flange, and a pair of locking members positioned within each interpolar space and disposed to provide contact respectively with the inner end of adjacent coils and the sides thereof, a stud engageable with said locking members for urging them into contact with said coils, said pole bodies being of a length at least equal to the depth of said coil plus the depth of said groove thereby to provide a space sufficient to permit mounting a coil on one pole body after a coil has been installed on the pole body adjacent thereto.

3. A rotor construction for a salient pole dynamoelectric machine comprising a magnetic core composed of steel laminations, each lamination including a central portion having radially extending pole bodies, grooves of pinetree configuration in the outer surface of each pole body and a pole shoe having a projection of similar pinetree design so that when the grooves are engaged by the projections of the pole shoe, the latter is restrained against radial displacement, a coil on each pole body having one end in contact with a pole shoe flange, and means in each interpolar space for holding coils on adjacent pole bodies against displacement, said means comprising at least one stud having threads extending throughout a major portion of its length, a first of a pair of blocks held on said stud by a threaded nut and having surfaces engageable with the side surfaces of said coils for resisting forces tending to move each coil toward the interpolar space when the rotor rotates, and the second of said pair of blocks positioned inwardly from the ends of adjacent coils and having surfaces in contact therewith for holding the other end of the coils against their respective pole shoe flanges, said second block being internally threaded to receive said stud which has its end bearing against said central portion in the interpolar space, so that when the stud is turned and bears against the central portion, the second block is moved outwardly against the ends of the coils and urges them into firm contact with their respective pole shoe flanges.

References Cited in the file of this patent

UNITED STATES PATENTS

| | | |
|---|---|---|
| 729,414 | Reist | May 26, 1903 |
| 992,548 | Dandliker | May 16, 1911 |
| 2,654,037 | Henter | Sept. 29, 1953 |
| 2,736,829 | Sills | Feb. 28, 1956 |